(12) United States Patent
Liu et al.

(10) Patent No.: US 8,060,455 B2
(45) Date of Patent: Nov. 15, 2011

(54) HOT TERM PREDICTION FOR CONTEXTUAL SHORTCUTS

(75) Inventors: Xiaozhong Liu, Syracuse, NY (US);
Vadim von Brzeski, San Jose, CA (US);
Reiner Kraft, Gilroy, CA (US)

(73) Assignee: Yahoo! Inc., Sunnyvale, CA (US)

( * ) Notice: Subject to any disclaimer, the term of this patent is extended or adjusted under 35 U.S.C. 154(b) by 885 days.

(21) Appl. No.: 11/967,864

(22) Filed: Dec. 31, 2007

(65) Prior Publication Data

US 2009/0171869 A1     Jul. 2, 2009

(51) Int. Cl.
*G06F 15/18* (2006.01)
*G06E 1/00* (2006.01)

(52) U.S. Cl. .................. 706/12; 706/21; 706/20

(58) Field of Classification Search .......... None
See application file for complete search history.

(56) References Cited

U.S. PATENT DOCUMENTS

| | | | |
|---|---|---|---|
| 6,018,738 A * | 1/2000 | Breese et al. ............... 707/749 |
| 2006/0026013 A1* | 2/2006 | Kraft ............................. 705/1 |
| 2006/0167857 A1 | 7/2006 | Kraft et al. |
| 2007/0073669 A1 | 3/2007 | Kraft |
| 2007/0074102 A1 | 3/2007 | Kraft et al. |
| 2007/0083429 A1 | 4/2007 | Kraft |

OTHER PUBLICATIONS

Bautin et al., M.,"Significant Phrases Detection", pp. 1-14, 2006.*
Kohrs et al., A., "Improving Collaborative Filtering with Multimedia Indexing Techniques to create User-Adapting Web Sites", ACM, pp. 27-36, 1999.*
Adomavicius et al., G., "Toward the Next Generation of Recommender Systems: A Survey of the State-of-the-Art and Possible Extensions", IEEE Transactions on Knowledge and Data Engineering, vol. 17, No. 6, pp. 734-749, Jun. 2005.*
Herlocker et al., J., "Evaluating Collaborative Filtering Recommender Systems", ACM Transactions of Information Systems, vol. 22, No. 1, pp. 5-53, Jan. 2004.*

* cited by examiner

*Primary Examiner* — Jeffrey A Gaffin
*Assistant Examiner* — Adrian Kennedy
(74) *Attorney, Agent, or Firm* — Berkeley Law & Technology Group, LLP

(57) ABSTRACT

Subject matter disclosed herein may relate to predicting hot terms, and may also relate to creating contextual shortcuts based, at least in part, on the predicted hot terms.

30 Claims, 7 Drawing Sheets

HOT TERM PREDICTION FOR CONTEXTUAL SHORTCUTS

FIELD

Subject matter disclosed herein may relate to predicting terms for use with contextual shortcuts.

BACKGROUND

With networks such as the Internet gaining tremendous popularity and with the vast multitude of pages and/or other documents and/or other media content becoming available to users via the World Wide Web (web), it has become desirable to provide efficient and streamlined approaches to searching for information desired by a user. Search systems and processes have been developed to meet the needs of users to obtain the desired information. Search engines, such as, for example, those provided over the web by Yahoo!, Google, and other web sites may be used by individuals to gather information. Typically, a user may input a query term and/or phrase and the search engine may return one or more links to sites and/or documents related to the query. The links returned may be very related, or they may be completely unrelated, to what the user was actually looking for. The "relatedness" of results to the query may be in part a function of the actual query entered as well as the robustness of the search system (underlying collection system) used.

Other techniques for allowing a user to specify desired information have been developed. For one example, in some or most news stories found at the Yahoo! News web site, various words may be highlighted in some fashion (underlined, for example) to indicate that the highlighted words represent keywords. The keywords may be selected by the user (by clicking on the keyword, for example) and additional information and/or documentation and/or links may be provided by a search engine or by some other agent. In this manner, the keywords may help the user to gather additional information and to dig deeper into the subjects that the user desires to learn more about. For example, if a user is reading a news story and desires more information on a topic, the user may select a keyword. A new box or window may open to provide the user with links to various other sources of information on the topic. The various sources of information may include, for example, related news stories, web sites, news photos, etc., that may add context to the topic. Difficulties with this approach to allowing a user to specify desired information may include, for example, challenges in determining which words of a news story might be of interest to a user so that appropriate keywords may be created by the web site developers.

BRIEF DESCRIPTION OF THE FIGURES

Claimed subject matter is particularly pointed out and distinctly claimed in the concluding portion of the specification. However, both as to organization and/or method of operation, together with objects, features, and/or advantages thereof, it may best be understood by reference to the following detailed description when read with the accompanying drawings in which:

Figure 1:
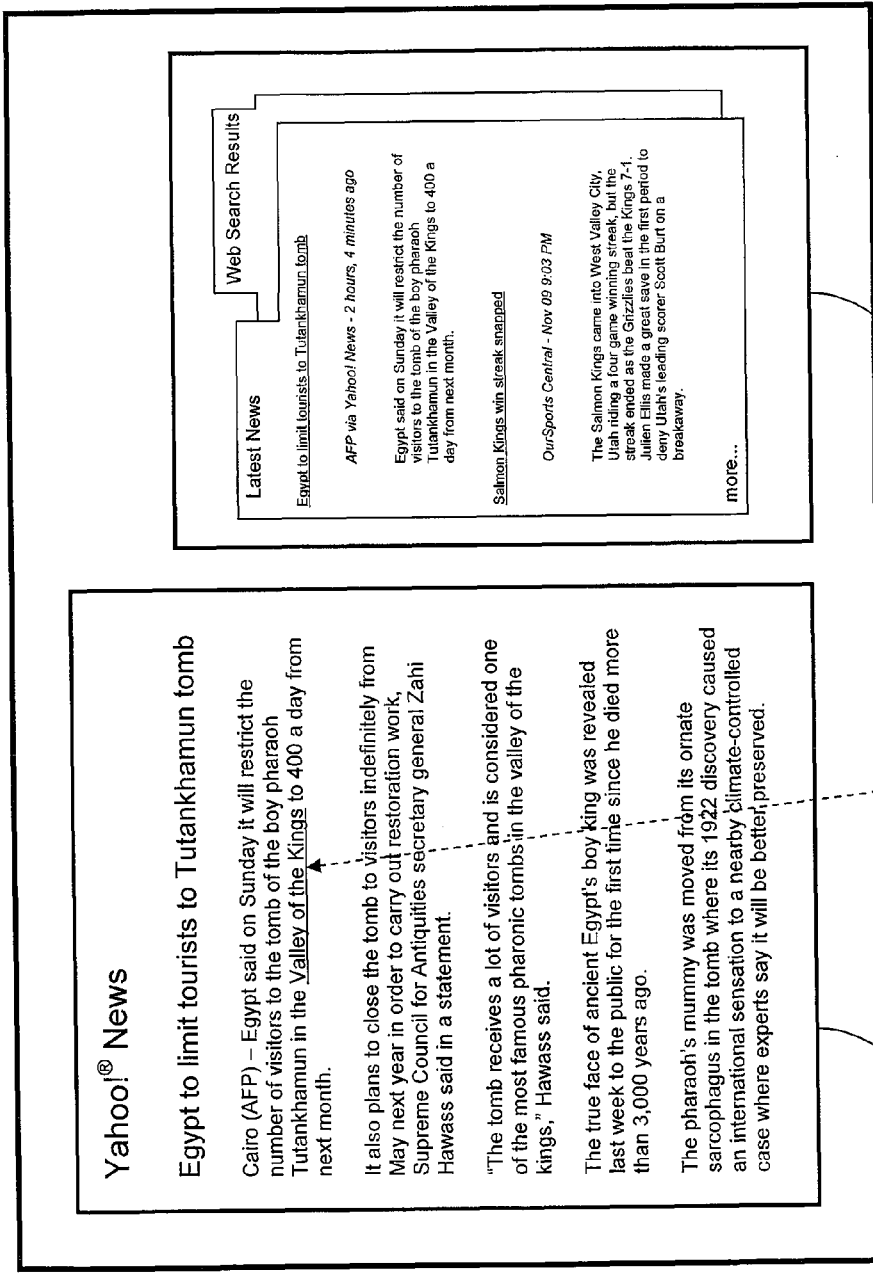
FIG. 1 is a diagram illustrating an example web browser display including a news story with a contextual shortcut and also including a pop-up window showing additional information related to the contextual shortcut in accordance with one or more embodiments.

Reference is made in the following detailed description to the accompanying drawings, which form a part hereof, wherein like numerals may designate like parts throughout to indicate corresponding or analogous elements. It will be appreciated that for simplicity and/or clarity of illustration, elements illustrated in the figures have not necessarily been drawn to scale. For example, the dimensions of some of the elements may be exaggerated relative to other elements for clarity. Further, it is to be understood that other embodiments may be utilized and structural and/or logical changes may be made without departing from the scope of claimed subject matter. It should also be noted that directions and references, for example, up, down, top, bottom, and so on, may be used to facilitate the discussion of the drawings and are not intended to restrict the application of claimed subject matter. Therefore, the following detailed description is not to be taken in a limiting sense and the scope of claimed subject matter defined by the appended claims and their equivalents.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

Embodiments claimed may include one or more apparatuses for performing the operations herein. These apparatuses may be specially constructed for the desired purposes, or they may comprise a general purpose computing platform selectively activated and/or reconfigured by a program stored in the device. The processes and/or displays presented herein are not inherently related to any particular computing platform and/or other apparatus. Various general purpose computing platforms may be used with programs in accordance with the teachings herein, or it may prove convenient to construct a more specialized computing platform to perform the desired method. The desired structure for a variety of these computing platforms will appear from the description below.

Embodiments claimed may include algorithms, programs and/or symbolic representations of operations on data bits or binary digital signals within a computer memory capable of performing one or more of the operations described herein. Although the scope of claimed subject matter is not limited in this respect, one embodiment may be in hardware, such as implemented to operate on a device or combination of devices, whereas another embodiment may be in software. Likewise, an embodiment may be implemented in firmware, or as any combination of hardware, software, and/or firmware, for example. These algorithmic descriptions and/or representations may include techniques used in the data processing arts to transfer the arrangement of a computing platform, such as a computer, a computing system, an electronic computing device, and/or other information handling system, to operate according to such programs, algorithms, and/or symbolic representations of operations. A program and/or process generally may be considered to be a self-consistent sequence of acts and/or operations leading to a desired result. These include physical manipulations of physical quantities. Usually, though not necessarily, these quantities take the form of electrical and/or magnetic signals capable of being stored, transferred, combined, compared, and/or otherwise manipulated. It has proven convenient at times, principally for reasons of common usage, to refer to these signals as bits, values, elements, symbols, characters, terms, numbers and/or the like. It should be understood, however, that all of these and/or similar terms are to be associated with the appropriate physical quantities and are merely convenient labels applied to these quantities. In addition, embodiments are not described with reference to any particular programming language. It will be appreciated that a variety of programming languages may be used to implement the teachings described herein.

Likewise, although the scope of claimed subject matter is not limited in this respect, one embodiment may comprise one or more articles, such as a storage medium or storage media. This storage media may have stored thereon instructions that when executed by a computing platform, such as a computer, a computing system, an electronic computing device, and/or other information handling system, for example, may result in an embodiment of a method in accordance with claimed subject matter being executed, for example. The terms "storage medium" and/or "storage media" as referred to herein relate to media capable of maintaining expressions which are perceivable by one or more machines. For example, a storage medium may comprise one or more storage devices for storing machine-readable instructions and/or information. Such storage devices may comprise any one of several media types including, but not limited to, any type of magnetic storage media, optical storage media, semiconductor storage media, disks, floppy disks, optical disks, CD-ROMs, magnetic-optical disks, read-only memories (ROMs), random access memories (RAMs), electrically programmable read-only memories (EPROMs), electrically erasable and/or programmable read-only memories (EEPROMs), flash memory, magnetic and/or optical cards, and/or any other type of media suitable for storing electronic instructions, and/or capable of being coupled to a system bus for a computing platform. However, these are merely examples of a storage medium, and the scope of claimed subject matter is not limited in this respect.

The term "instructions" as referred to herein relates to expressions which represent one or more logical operations. For example, instructions may be machine-readable by being interpretable by a machine for executing one or more operations on one or more data objects. However, this is merely an example of instructions, and the scope of claimed subject matter is not limited in this respect. In another example, instructions as referred to herein may relate to encoded commands which are executable by a processor having a command set that includes the encoded commands. Such an instruction may be encoded in the form of a machine language understood by the processor. For an embodiment, instructions may comprise run-time objects, such as, for example, Java and/or Javascript objects. However, these are merely examples of an instruction, and the scope of claimed subject matter is not limited in this respect.

Unless specifically stated otherwise, as apparent from the following discussion, it is appreciated that throughout this specification discussions utilizing terms such as processing, computing, calculating, selecting, forming, enabling, inhibiting, identifying, initiating, receiving, transmitting, determining, estimating, incorporating, adjusting, modeling, displaying, sorting, applying, varying, delivering, appending, making, presenting, distorting and/or the like refer to the actions and/or processes that may be performed by a computing platform, such as a computer, a computing system, an electronic computing device, and/or other information handling system, that manipulates and/or transforms data represented as physical electronic and/or magnetic quantities and/or other physical quantities within the computing platform's processors, memories, registers, and/or other information storage, transmission, reception and/or display devices. Further, unless specifically stated otherwise, processes described herein, with reference to flow diagrams or otherwise, may also be executed and/or controlled, in whole or in part, by such a computing platform.

Reference throughout this specification to "one embodiment" or "an embodiment" means that a particular feature, structure, or characteristic described in connection with the embodiment is included in at least one embodiment of claimed subject matter. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

The term "and/or" as referred to herein may mean "and", it may mean "or", it may mean "exclusive-or", it may mean "one", it may mean "some, but not all", it may mean "neither", and/or it may mean "both", although the scope of claimed subject matter is not limited in this respect.

As discussed above, the vast quantities of information available via the world wide web poses challenges for users seeking out information on particular topics. As also mentioned above, one approach to allowing a user to specify desired information may include highlighting keywords in an online document such as, for example, a news story on a web site. The keywords may represent query terms and/or phrases that may be used by a search engine or other agent to provide links to other documents, web sites, and/or other media content. These keywords may also be referred to as "contextual shortcuts", in that they may provide shortcuts (links) to additional content related to the particular topic identified by the keyword.

FIG. 1 is a diagram illustrating an example web browser display 100. The display may be viewed by a user on an electronic device. For this example, browser display 100 may be generated by a web browser application that facilitates navigation of the web by the user. The web browser may display any of a very wide range of information from a very wide range of web sites located across the web. For this example, browser display 100 depicts a news story 102 from a Yahoo!® News website. Of course, this is merely an example of the types of information that may be displayed via the web browser, and the scope of claimed subject matter is not limited in this respect.

For this example, a contextual shortcut 104 ("Valley of the Kings") is embedded within news story 102. If a user, upon reading news story 102, desires additional information regarding the subject of contextual shortcut 104, the user may select the contextual shortcuts. For an embodiment, the user may select contextual shortcut 104 by "clicking" on the shortcut with a pointing device (such as, for example, a mouse), although the scope of claimed subject matter is not limited in this respect.

In response to selecting the contextual shortcut, a pop-up window 106 may be displayed. Pop-up window 106 may include additional information related to the subject of contextual shortcut 104. For this example, additional information related to the "Valley of the Kings" is displayed. This information may include, for example, hyperlinks to other websites where additional information may be found. The information may also include photographs and/or other media content. Any of a wide range of information types may be included in pop-up window 106. By providing contextual shortcut 104, the developers of the website make it easier for the user to gather relevant information related to a topic of interest.

As discussed previously, difficulties with the contextual shortcut approach discussed above may include challenges in determining which topics in an online document might be of interest to users so that appropriate contextual shortcuts may be created by web site developers and so that the web site developers can select appropriate additional content to be associated with the contextual shortcuts to be displayed in response to a selection of the contextual shortcut. To this end, it may be desirable to be able to discern in advance which topics are likely to be relatively popular choices among a relatively large number of users.

As used herein, the term "hot term" denotes, at least in part, a search and/or query term that is relatively frequently specified by relatively large numbers of users. In other words, a "hot term" may comprise a popular search and/or query term. For various embodiments described herein, predicting hot terms may include determining search and/or query terms that are likely to become hot terms within a specified period of time. Also, as used herein, "term" is meant to comprise a string of one or more words and/or abbreviations, for example, although the scope of claimed subject matter is not limited in this respect.

Figure 2:
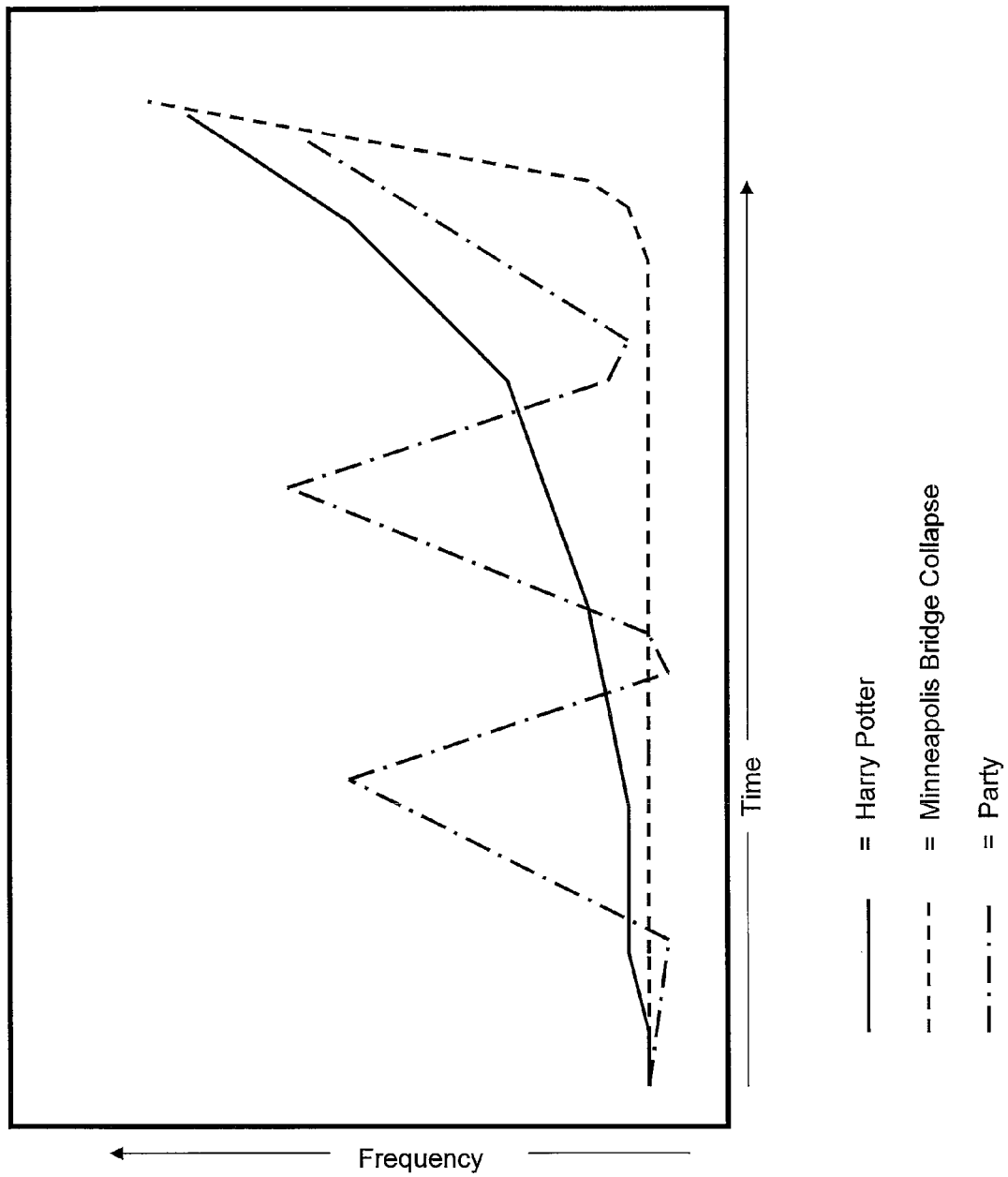
FIG. 2 is a graph diagram depicting several example query term frequencies over a period of time.

FIG. 2 is a graph diagram depicting query frequencies for several query terms over a period of time. Of course, these are merely example query terms, and the scope of claimed subject matter is not limited in this respect. For this example, consider the terms "Harry Potter", "Minneapolis Bridge Collapse", and "Party". In FIG. 2, the vertical axis represents query term frequency and the horizontal axis represents time. For this embodiment, query term frequency is a measure of how many times a particular query term is specified by the universe users utilizing a search engine for a particular day. Thus, a relatively high query term frequency denotes a query and/or search term that is specified by relatively large numbers of users for that period of time.

As can be seen in FIG. 2, at the end time shown in the graph, each of the query terms in this example has achieved a relatively high frequency. However, the history for each of the terms varies somewhat from each other. For example, the term "Minneapolis Bridge Collapse" showed little or no activity up until a point in time near the end of the graph, where there is a sudden increase in the query term frequency for that term. This makes sense, because for this example the interest in the topic was sparked by a single, unpredictable event. There would have been little or no reason for any interest in the query term ahead of the event.

On the other hand, consider the example query term "Party". This term shows a pattern of alternating high and low query frequency. For example, there may be a spike in query frequency for this term every time Friday rolls around, as individuals make plans for the weekend. For this example, one may be able to predict future activity for this term by observing the pattern found in the history for this term, unlike the "Minneapolis Bridge Collapse" example above, where it would not have been possible to predict the spike in query frequency by observing past history.

The term "Harry Potter" is an example of another category of terms, where there is a relatively strong increase in query term frequency over a relatively short period of time. Unlike the "Minneapolis Bridge Collapse" example, where there was no way to look at the history to predict the sudden increase in frequency, for the "Harry Potter" example there may be an indication in the period of time leading up to the end of the graph that the term is about to become a hot term. It may be desirable to predict such hot terms in order to enable web site editors and/or developers to create contextual shortcuts for the predicted hot terms, thereby meeting the needs and/or desires of a greater number of users, resulting in improved browsing experiences by the users.

Figure 3:
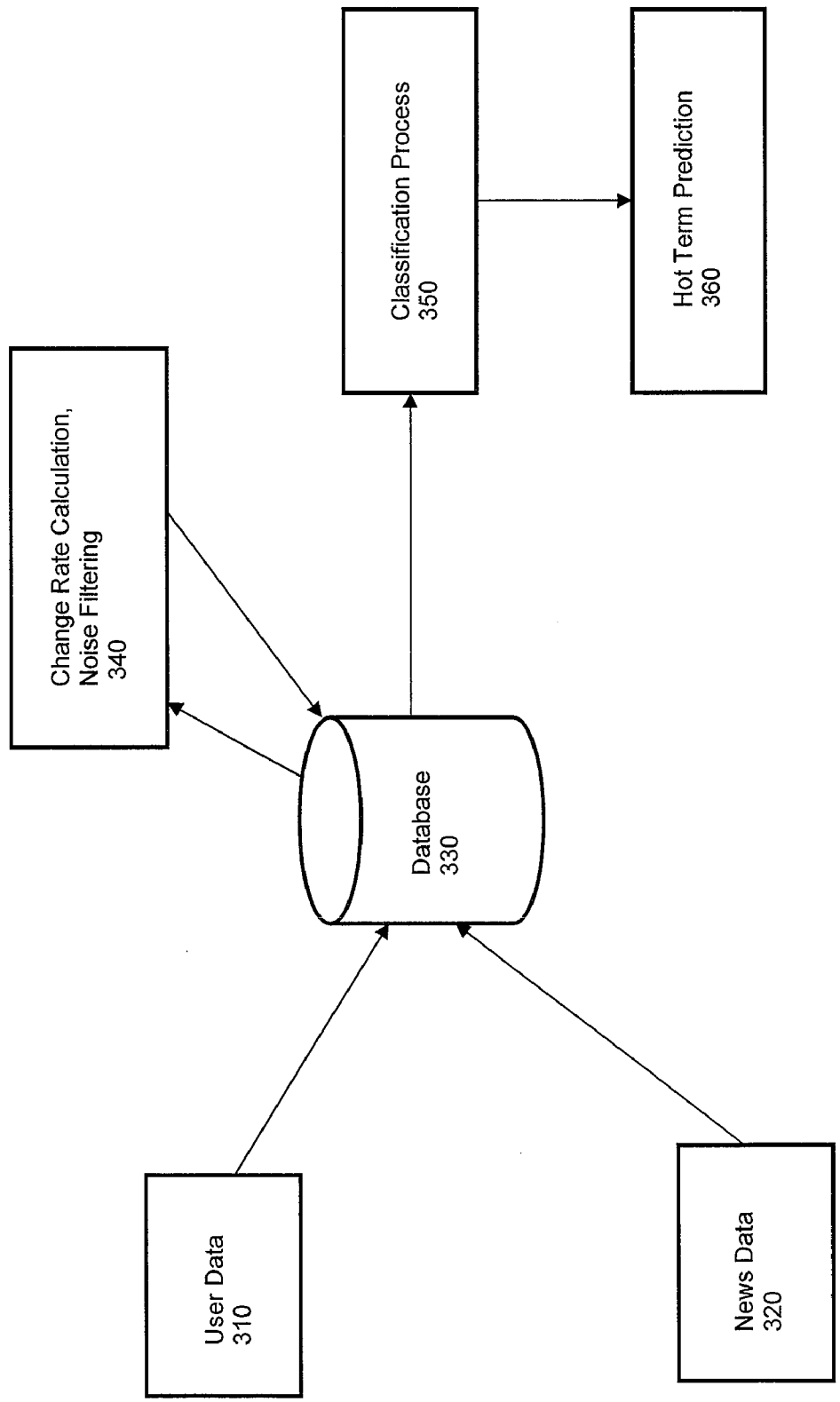
FIG. 3 is a block diagram illustrating an example system and/or process for predicting hot terms in accordance with one or more embodiments.

FIG. 3 is a block diagram illustrating an example system and/or process for predicting hot terms in accordance with one or more embodiments. For this example, user data 310 and/or news data 320 may be gathered and stored in a database 330. User data 310 for this example may comprise daily query log files. The log files may comprise an array of query terms and/or phrases, and may also comprise frequency information for each of the query terms. The frequency information for this example may indicate the number of times each query term was specified by a user performing a search on a search engine over a period of time. For this example, the period of time is one day. However, these are merely examples of the type and/or format of information that may be contained in query log files, and the scope of claimed subject matter is not limited in this respect.

News data 320 for one or more embodiments may comprise an array of phrases extracted from news stories. For this example, phrases may be extracted from the daily news corpus. That is, each day's news stories are collected and phrases may be extracted therefrom. The extracted phrases may be referred to as "entities", and the terms "entity" and "phrase" as applied to news data herein are synonymous, and may be used interchangeably. The extraction of the news entities may be performed in an automated fashion by any extraction process capable of extracting phrases from news documents. Also, news data 320 may comprise frequency information related to each of the array of extracted phrases. The frequency information may comprise the number of times for a period of time each of the array of extracted phrases occurs in the new corpus. For this example, the period of time is one day, although the scope of claimed subject matter is not limited in this respect.

User data 310 and News data 320 may be processed, in one or more embodiment, by an apparatus and/or process 340 for calculating rates of change for the frequencies of the various terms and phrases of the user and news data. Apparatus and/or process 340 may also provide noise filtering functionalities. For example, terms with a history that approximates the history described above in connection with the term "Party" may be detected, and appropriate action taken to prevent a false identification of potential hot term.

A classification process 350 may be utilized to determine probability values for the arrays of user and/or news data. The probability values for this example indicate the calculated likelihood that a particular term or phrase will become a hot term. For one or more embodiments, the classification process may comprise a machine learning process, such as, for example, machine learning process C4.5, although the scope of claimed subject matter is not limited in this respect. By using a machine learning process, the hot term prediction process may be refined over time, and more accurate results may result.

In response to the determination of the probability values, a hot term prediction process 360 may be completed. For an embodiment, the final prediction may be based on a ranking of the arrays of user data 310 and/or news data 320 in accordance to the determined probability values. Those terms or phrases whose probability values exceed a specified threshold may be classified as hot terms. The hot term information may be used by web page editors to create contextual shortcuts for one or more of the hot terms. For one or more embodiment, an automated process may be employed to create the contextual shortcuts based, at least in part, on the predicted hot terms.

User data 310 and news data 320 as well as data for other embodiments discussed below are described herein as being organized in arrays. The term "array" as used herein is meant to denote any organization of data that is capable of including one or more lists of query terms and/or phrases and/or one or more lists of news entities (extracted phrases). The organization of the user and news data described herein are merely examples, and the scope of claimed subject matter is not limited in this respect.

Figure 4:
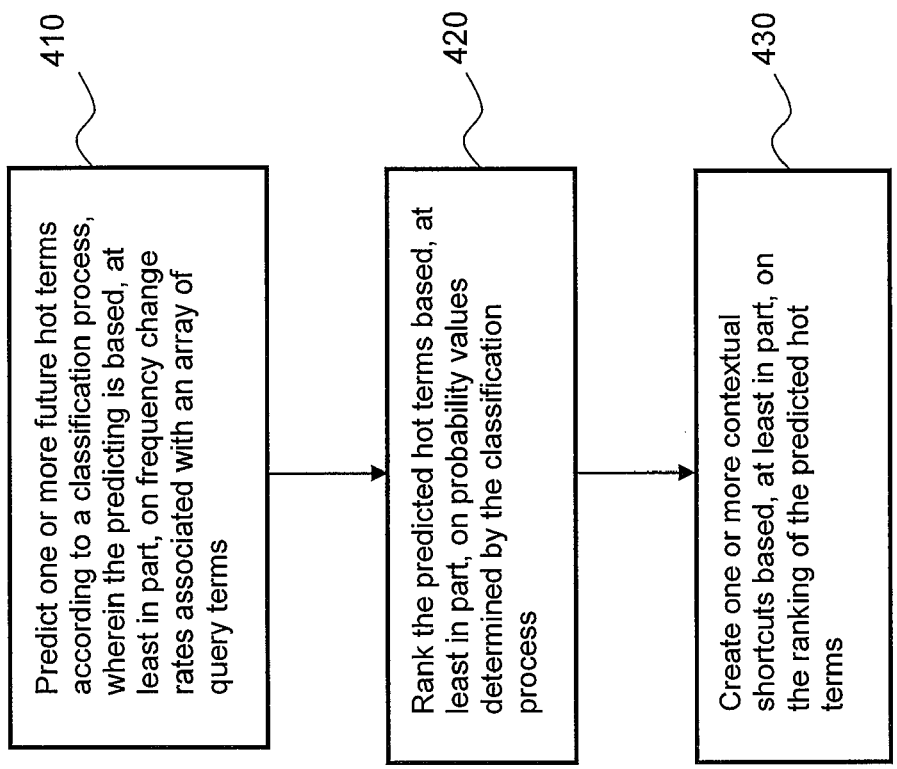
FIG. 4 is a flow diagram illustrating an example process for predicting hot terms based, at least in part, on frequency change rates associated with an array of query terms.

FIG. 4 is a flow diagram illustrating an example process for predicting hot terms based, at least in part, on frequency change rates associated with an array of query terms. At 410, one or more future hot terms may be predicted according to a classification process, wherein said predicting is based, at least in part, on frequency change rates associated with an array of query terms. For an example embodiment, frequency change rates may be calculated according to the formula:

$$\text{Change\_Rate}(q,m) = \text{Query\_Freq}(q,m) * \text{Query\_Freq}(q,m-2)/\text{Query\_Freq}(q,m-1)^2$$

wherein Change_Rate(q,m) represents the change rate for query "q" on day "m" and wherein Query_Freq(q,m) represents the query frequency for query "q" on day "m". However, this is merely an example of how change rates may be calculated, and the scope of claimed subject matter is not limited in this respect.

For this example embodiment, the classification process may comprise a machine learning process, such as, for example, machine learning process C4.5. However, this is merely an example of a classification process that may be used with embodiments described herein, and the scope of claimed subject matter is not limited in this respect.

At block 420, the predicted hot terms may be ranked based, at least in part, on probability values determined by the classification process. The probability values for this example may denote the calculated likelihood that a particular term or phrase will become a hot term. At 430, one or more contextual shortcuts may be created based, at least in part, on the ranking of the predicted hot terms. For an embodiment, predicted hot terms whose probability values exceed a specified and/or programmable threshold value may be used in creating the contextual shortcuts. The creation of the shortcuts may be performed automatically, and/or may be performed by web site editors and/or programmers.

For one or more embodiments, the contextual shortcuts may be embedded within a news story or other document. A user may select one or more of the contextual shortcuts, and in response to the selecting of the contextual shortcuts, one or more pop-up windows may be displayed. The pop-up windows may include additional information related to the subject of contextual shortcut. The information may include, for example, hyperlinks to other websites and/or other documents or stories within the same website where additional information may be found. The information may also include photographs and/or other media content. Any of a wide range of information types may be included in the pop-up window. Although this example embodiment describes a pop-up window for displaying information to the user in response to a selection of a contextual shortcut, other embodiments may utilize other techniques for communicating the additional information to the user, and the scope of claimed subject matter is not limited in this respect. Example processes in accordance with claimed subject matter may include all, more than all, or less than all of blocks 410-430. Further, the order of blocks 410-430 is merely an example order, and the scope of claimed subject matter is not limited in this respect.

Figure 5:
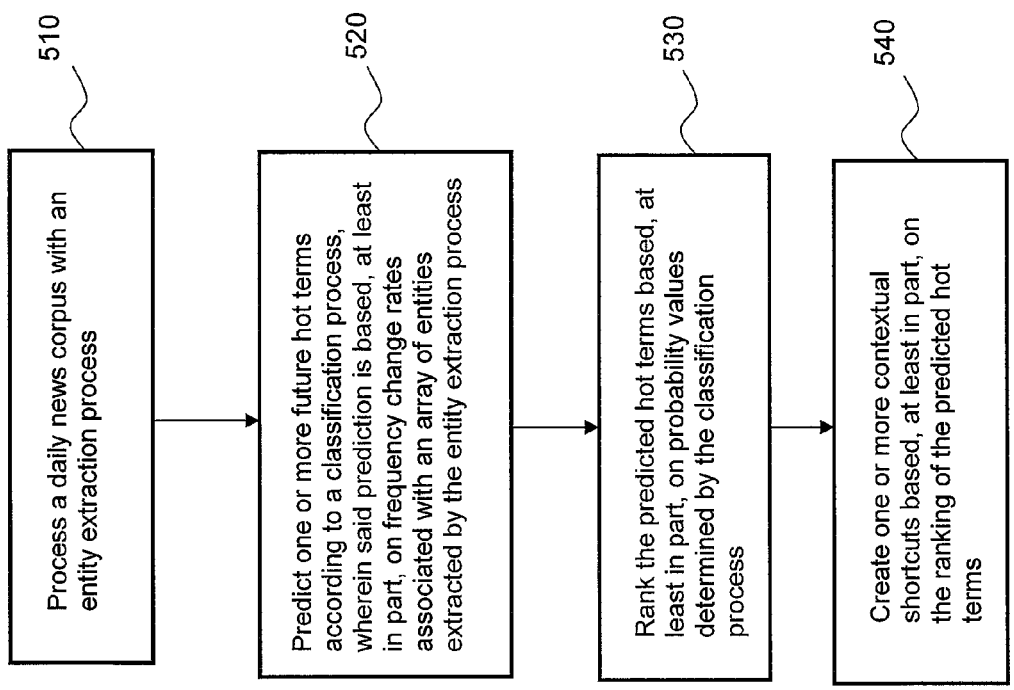
FIG. 5 is a flow diagram illustrating an example process for predicting hot terms based, at least in part, on frequency change rates associated with an array of entities from a daily news corpus extracted by an entity extraction process.

FIG. 5 is a flow diagram illustrating an example process for predicting hot terms based, at least in part, on frequency change rates associated with an array of entities from a daily news corpus. At block 510, the daily news corpus may be processed with an entity extraction process. Each day's news stories may be collected and phrases may be extracted therefrom. The extraction of the news entities may be performed in an automated fashion by any extraction process capable of extracting phrases from news documents, although the scope of claimed subject matter is not limited in this respect. Also, for one or more embodiments, the extraction process may ignore frequently used words such as "a", "the", "it", etc.

At block 520, one or more future hot terms may be predicted according to a classification process, wherein said predicting is based, at least in part, on frequency change rates associated with an array of entities extracted by the entity extraction process. At block 530, the predicted hot terms may be ranked, at least in part, on probability values determined by the classification process. The probability values for this example may denote the calculated likelihood that a particular news entity (phrase) will become a hot term. At 540, one or more contextual shortcuts may be created based, at least in part, on the ranking of the predicted hot terms. For an embodiment, predicted hot terms whose probability values exceed a specified and/or programmable threshold value may be used in creating the contextual shortcuts. The creation of the shortcuts may be performed automatically, and/or may be performed by web site editors and/or programmers. Example processes in accordance with claimed subject matter may include all, more than all, or less than all of blocks 510-540. Further, the order of blocks 510-540 is merely an example order, and the scope of claimed subject matter is not limited in this respect.

Figure 6:
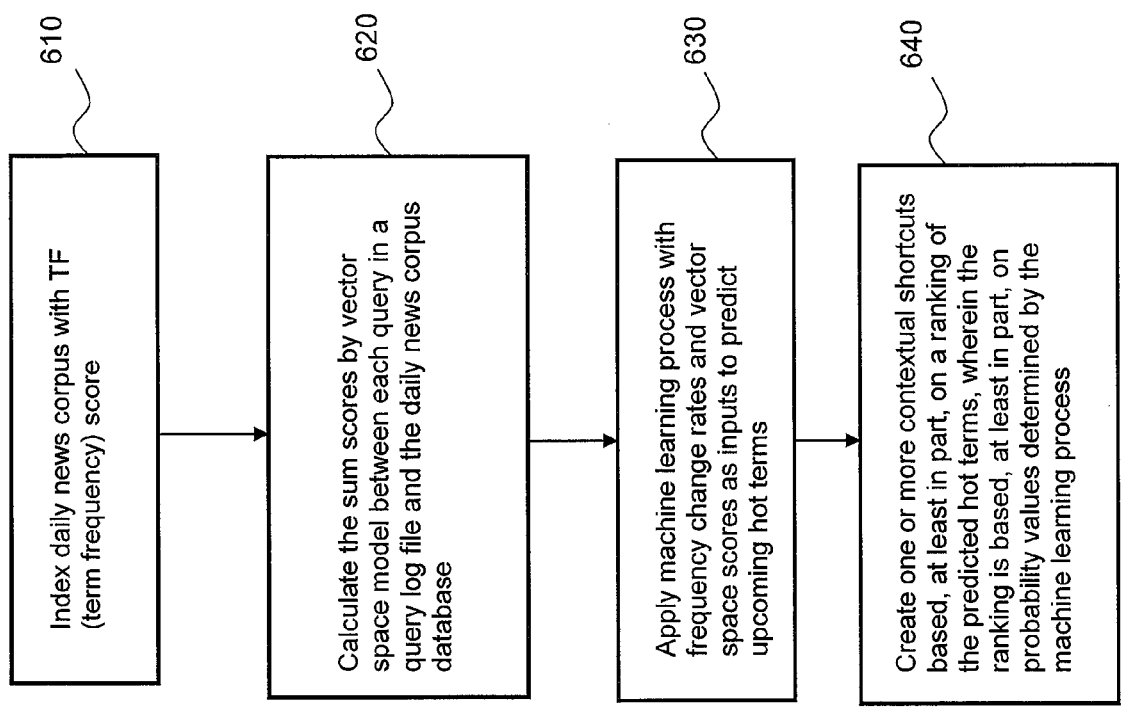
FIG. 6 is a flow diagram illustrating an example process for predicting hot terms based, at least in part, on frequency change rates associated with an array of query terms and on term frequency scores for a daily news corpus.

FIG. 6 is a flow diagram illustrating an example process for predicting hot terms based, at least in part, on frequency change rates associated with an array of query terms and on term frequency (TF) scores for a daily news corpus. Thus, for this example embodiment, both query data obtained from users and news entity data obtained from the daily news corpus are utilized to predict hot terms. At block 610, a daily news corpus may be indexed with TF scores for each news phrase that may be extracted from the daily news corpus. The TF score may be considered, at least in some respects, to be a measure of the importance of a term within a document. The term frequency score may represent the number of occurrences of a particular term within a given document. Thus, a term that occurs frequently within a particular document would receive a high TF score.

At block 620, the sum scores between each query in a query log file and the daily news corpus database are calculated by way of vector space model according to a formula given below. For this example embodiment, the daily news corpus may be organized into a plurality of vectors (one dimension arrays), wherein each vector is associated with a particular news document, and wherein the values of a vector associated with a news document comprise the TF scores for the phrases found within that news document. Each query may also be organized into a vector. The query vector comprises the frequency information for each of the elements of a particular query. For most of the elements of the query vector, the frequency value will be zero. For example, a hot term prediction process may have a vocabulary of 10,000 words, although, of course, this is merely an example number of words, and the scope of claimed subject matter is not limited in these respects. For this example, each of the query and news vectors will have 10,000 elements. Because a query phrase typically has only two or three words, the vast majority of the 10,000 vocabulary words will not be present in the query phrase, and the frequency values in the query vector for those words will be zero. For the words that are found to be included in the query phrase, the frequency value for those words will be one. Similarly, a vector corresponding to a particular news document includes values representing the number of occurrences of each of the 10,000 vocabulary words in that news document.

The sum scores between each query in a query log file and the daily news corpus database are calculated in vector space according to the following formula:

$$\text{Score(query, daily news)} = \sum_{i=1}^{n} \cos\theta$$
$$= \sum_{i=1}^{n} \frac{\text{Vector(query)} \cdot \text{Vector}(news_i)}{|\text{Vector(query)}| \cdot |\text{Vector}(news_i)|}$$

wherein "i" is the number of news documents in the news corpus and wherein Score(query, daily news) represents what may be considered to be a measure of similarity between the query vector and the news corpus. For an embodiment, the above process may be repeated for each query term or phrase in the query log file. Of course, the formula above is merely an example technique for measuring the similarity between a query and the news corpus, and the scope of claimed subject matter is not limited in this respect.

For an embodiment, the vector space scores for different days, perhaps consecutive days for one example, for a query may be used to determine a change rate for the combined query and news data. For example:

$$\text{Query\_News\_ChangeRate(query, } day_1, day_2) = \frac{\text{Score(query, } day_1)}{\text{Score(query, } day_2)}$$

wherein Query_News_ChangeRate(query, $day_1$, $day_2$) represents a rate of change for a query term "query" combined with news data as described above for the period of time defined between $day_1$ and $day_2$.

At block 630, a machine learning process or other classification process may be used to predict upcoming hot terms. For this example embodiment, the news frequency change rate (described, for example, above in connection with FIG. 5), and the query news score change rate (Query_News_ChangeRate) may be applied as inputs to the machine learning process. In other embodiments, other information may be supplied to the machine learning process, such as, for example, query change rates. At block 640, one or more contextual shortcuts may be created based, at least in part, on a ranking of the predicted hot terms, wherein the ranking is based, at least in part, on probability values determined by the machine learning process. Example processes in accordance with claimed subject matter may include all, more than all, or less than all of blocks 610-640. Further, the order of blocks 610-640 is merely an example order, and the scope of claimed subject matter is not limited in this respect.

Figure 7:
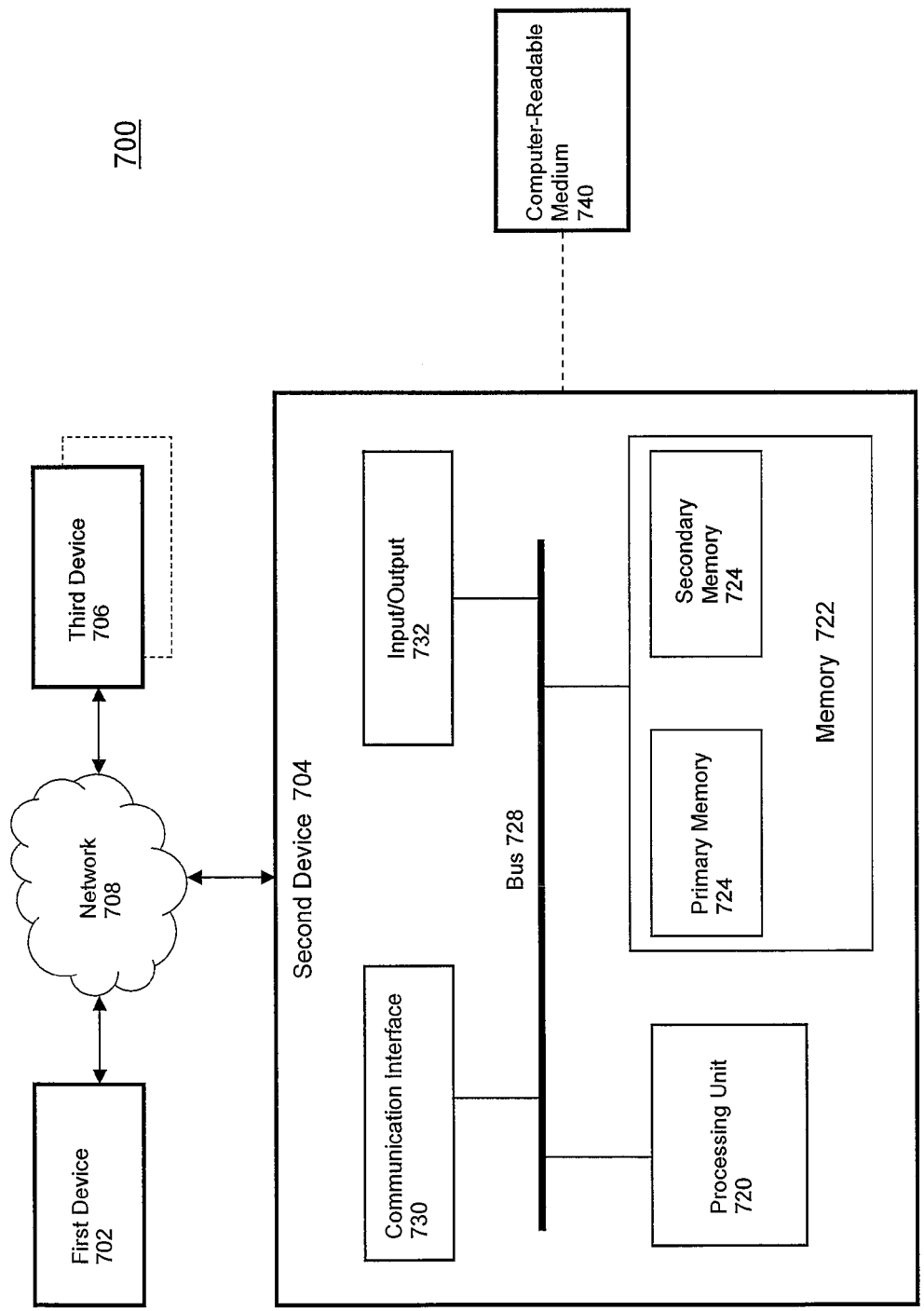
FIG. 7 is a block diagram illustrating an example system comprising a plurality of computing devices coupled via a network in accordance with one or more embodiments.

FIG. 7 is a schematic diagram illustrating an exemplary embodiment of a computing environment system 700 that may include one or more devices configurable to predict hot terms and/or create contextual shortcuts using one or more techniques illustrated above, for example. System 700 may include, for example, a first device 702, a second device 704, and a third device 706, which may be operatively coupled together through a network 708.

First device 702, second device 704 and third device 706, as shown in FIG. 7, may be representative of any device, appliance or machine that may be configurable to exchange data over network 708. By way of example but not limitation, any of first device 702, second device 704, or third device 706 may include: one or more computing devices and/or platforms, such as, e.g., a desktop computer, a laptop computer, a workstation, a server device, or the like; one or more personal computing or communication devices or appliances, such as, e.g., a personal digital assistant, mobile communication device, or the like; a computing system and/or associated service provider capability, such as, e.g., a database or data storage service provider/system, a network service provider/system, an Internet or intranet service provider/system, a portal and/or search engine service provider/system, a wireless communication service provider/system; and/or any combination thereof.

Similarly, network 708, as shown in FIG. 7, is representative of one or more communication links, processes, and/or resources configurable to support the exchange of data between at least two of first device 702, second device 704, and third device 706. By way of example but not limitation, network 708 may include wireless and/or wired communication links, telephone or telecommunications systems, data buses or channels, optical fibers, terrestrial or satellite resources, local area networks, wide area networks, intranets, the Internet, routers or switches, and the like, or any combination thereof. As illustrated, for example, by the dashed lined box illustrated as being partially obscured of third device 706, there may be additional like devices operatively coupled to network 708.

It is recognized that all or part of the various devices and networks shown in system 700, and the processes and methods as further described herein, may be implemented using or otherwise include hardware, firmware, software, or any combination thereof.

Thus, by way of example but not limitation, second device 704 may include at least one processing unit 720 that is operatively coupled to a memory 722 through a bus 728.

Processing unit 720 is representative of one or more circuits configurable to perform at least a portion of a data computing procedure or process. By way of example but not limitation, processing unit 720 may include one or more processors, controllers, microprocessors, microcontrollers, application specific integrated circuits, digital signal processors, programmable logic devices, field programmable gate arrays, and the like, or any combination thereof.

Memory 722 is representative of any data storage mechanism. Memory 722 may include, for example, a primary memory 724 and/or a secondary memory 726. Primary memory 724 may include, for example, a random access memory, read only memory, etc. While illustrated in this example as being separate from processing unit 720, it should be understood that all or part of primary memory 724 may be provided within or otherwise co-located/coupled with processing unit 720.

Secondary memory 726 may include, for example, the same or similar type of memory as primary memory and/or one or more data storage devices or systems, such as, for example, a disk drive, an optical disc drive, a tape drive, a solid state memory drive, etc. In certain implementations, secondary memory 726 may be operatively receptive of, or otherwise configurable to couple to, a computer-readable medium 740. Computer-readable medium 740 may include, for example, any medium that can carry and/or make accessible data, code and/or instructions for one or more of the devices in system 700.

Second device 704 may include, for example, a communication interface 730 that provides for or otherwise supports the operative coupling of second device 704 to at least network 708. By way of example but not limitation, communication interface 730 may include a network interface device or card, a modem, a router, a switch, a transceiver, and the like.

Second device 704 may include, for example, an input/output 732. Input/output 732 is representative of one or more devices or features that may be configurable to accept or otherwise introduce human and/or machine inputs, and/or one or more devices or features that may be configurable to deliver or otherwise provide for human and/or machine outputs. By way of example but not limitation, input/output device 732 may include an operatively configured display, speaker, keyboard, mouse, trackball, touch screen, data port, etc.

It should also be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Such software and/or firmware may be expressed as machine-readable instructions which are executable by a processor. Likewise, although the claimed subject matter is not limited in scope in this respect, one embodiment may comprise one or more articles, such as a storage medium or storage media. This storage media, such as one or more CD-ROMs and/or disks, for example, may have stored thereon instructions, that when executed by a system, such as a computer system, computing platform, or other system, for example, may result in an embodiment of a method in accordance with the claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive, although, again, the claimed subject matter is not limited in scope to this example.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

What is claimed is:

1. A method, comprising:
   predicting one or more future hot terms according to a classification process utilizing a processor of a computing platform, wherein said predicting is based, at least in part, on frequency change rates associated with an array of query terms;
   ranking the one or more predicted future hot terms utilizing the processor based, at least in part, on probability values determined by the classification process; and
   creating one or more contextual shortcuts associated with the respective one or more predicted future hot terms utilizing the processor based, at least in part, on the ranking of the one or more predicted future hot terms, wherein the one or more contextual shortcuts comprise one or more selectable links in an online document to additional online content related to the respective one or more predicted future hot terms.

2. The method of claim 1, wherein the classification process comprises a machine learning process.

3. The method of claim 2, wherein the machine learning process comprises a C4.5 machine learning algorithm.

4. The method of claim 1, wherein said predicting one or more future hot terms is further based on an array of news terms derived from daily news text.

5. The method of claim 4, further comprising indexing the array of news terms with a term frequency score for each term of the array of news terms.

6. The method of claim 5, further comprising calculating vector space scores between the array of query terms and the indexed array of news terms.

7. The method of claim 6, wherein said predicting one or more future hot terms is based, at least in part, on the vector space scores.

8. A method, comprising:
   processing an online daily news corpus with an entity extraction process utilizing a processor of a computing platform;
   predicting one or more future hot terms according to a classification process utilizing the processor, wherein said predicting is based, at least in part, on frequency change rates associated with an array of entities extracted by the entity extraction process;
   ranking the one or more predicted future hot terms utilizing the processor based, at least in part, on probability values determined by the classification process; and
   creating one or more contextual shortcuts associated with the respective one or more predicted future hot terms utilizing the processor based, at least in part, on the ranking of the one or more predicted future hot terms, wherein the one or more contextual shortcuts comprise one or more selectable links in one or more online documents to additional online content related to the respective one or more predicted future hot terms.

9. The method of claim 8, wherein the classification process comprises a machine learning process.

10. The method of claim 9, wherein the machine learning process comprises a C4.5 machine learning algorithm.

11. An article, comprising: a computer-readable medium having stored thereon instructions executable by a processor of a computing platform to:
predict one or more future hot terms according to a classification process, is based, at least in part, on frequency change rates associated with an array of query terms;
rank the one or more predicted future hot terms based, at least in part, on probability values determined by the classification process; and
create one or more contextual shortcuts associated with the respective one or more predicted future hot terms based, at least in part, on the ranking of the one or more predicted future hot terms, wherein the one or more contextual shortcuts comprise one or more selectable links in an online document to additional online content related to the respective one or more predicted future hot terms.

12. The article of claim 11, wherein the classification process comprises a machine learning process.

13. The article of claim 12, wherein the machine learning process comprises a C4.5 machine learning algorithm.

14. The article of claim 11, wherein the computer-readable medium has stored thereon further instructions executable by the processor to predict the one or more future hot terms is based on an array of news terms derived from daily news text.

15. The article of claim 14, wherein the computer-readable medium has stored thereon further instructions executable by the processor to index the array of news terms with a term frequency score for each term of the array of news terms.

16. The article of claim 15, wherein the computer-readable medium has stored thereon further instructions executable by the processor to calculate vector space scores between the array of query terms and the indexed array of news terms.

17. The article of claim 16, wherein the computer-readable medium has stored thereon further instructions executable by the processor to predict the one or more future hot terms is based, at least in part, on the vector space scores.

18. An article, comprising: a computer-readable medium have stored thereon instructions executable by a processor of a computing platform to:
process a daily news corpus with an entity extraction process;
predict one or more future hot terms according to a classification process, wherein said predicting is based, at least in part, on frequency change rates associated with an array of entities extracted by the entity extraction process;
ranking the one or more predicted future hot terms based, at least in part, on probability values determined by the classification process; and
creating one or more contextual shortcuts associated with the respective one or more predicted future hot terms based, at least in part, on the ranking of the one or more predicted future hot terms, wherein the one or more contextual shortcuts comprise one or more selectable links in an online document to additional online content related to the respective one or more predicted future hot terms.

19. The article of claim 18, wherein the classification process comprises a machine learning process.

20. The article of claim 19, wherein the machine learning process comprises a C4.5 machine learning algorithm.

21. An apparatus, comprising:
means for predicting one or more future hot terms according to a classification process, wherein said predicting is based, at least in part, on frequency change rates associated with an array of query terms;
means for ranking the one or more predicted future hot terms based, at least in part, on probability values determined by the classification process; and
means for creating one or more contextual shortcuts associated with the respective one or more predicted future hot terms based, at least in part, on the ranking of the one or more predicted future hot terms, wherein the one or more contextual shortcuts comprise one or more selectable links in an online document to additional online content related to the respective one or more predicted future hot terms.

22. The apparatus of claim 21, wherein the classification process comprises a machine learning process.

23. The apparatus of claim 22, wherein the machine learning process comprises a C4.5 machine learning algorithm.

24. The apparatus of claim 21, wherein said predicting one or more future hot terms is further based on an array of news terms derived from daily news text.

25. The apparatus of claim 24, further comprising means for indexing the array of news terms with a term frequency score for each term of the array of news terms.

26. The apparatus of claim 25, further comprising means for calculating vector space scores between the array of query terms and the indexed array of news terms.

27. The apparatus of claim 26, wherein said predicting one or more future hot terms is based, at least in part, on the vector space scores.

28. An apparatus, comprising:
means for processing a daily news corpus with an entity extraction process;
means for predicting one or more future hot terms according to a classification process, wherein said predicting is based, at least in part, on frequency change rates associated with an array of entities extracted by the entity extraction process;
means for ranking the one or more predicted future hot terms based, at least in part, on probability values determined by the classification process; and
means for creating one or more contextual shortcuts associated with the respective one or more predicted future hot terms utilizing the processor based, at least in part, on the ranking of the one or more predicted future hot terms, wherein the one or more contextual shortcuts comprise one or more selectable links in an online document to additional online content related to the respective one or more predicted future hot terms.

29. The apparatus of claim 28, wherein the classification process comprises a machine learning process.

30. The apparatus of claim 29, wherein the machine learning process comprises a C4.5 machine learning algorithm.

* * * * *